US012597355B2

(12) United States Patent
Hamada et al.

(10) Patent No.: US 12,597,355 B2
(45) Date of Patent: Apr. 7, 2026

(54) NAVIGATION CONTROL SYSTEM AND MARINE VESSEL

(71) Applicant: YAMAHA HATSUDOKI KABUSHIKI KAISHA, Iwata (JP)

(72) Inventors: Satoru Hamada, Shizuoka (JP); Akihiro Onoue, Shizuoka (JP); Toshio Suzuki, Shizuoka (JP); Masaru Suemori, Shizuoka (JP); Yoshiyuki Kadobayashi, Shizuoka (JP); Manami Oyama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 170 days.

(21) Appl. No.: 18/490,873

(22) Filed: Oct. 20, 2023

(65) Prior Publication Data

US 2024/0144831 A1      May 2, 2024

(30) Foreign Application Priority Data

Oct. 31, 2022    (JP) ................................. 2022-174350

(51) Int. Cl.
| | |
|---|---|
| *G08G 3/02* | (2006.01) |
| *B63H 21/21* | (2006.01) |
| *B63H 25/04* | (2006.01) |
| *G05D 1/00* | (2024.01) |

(52) U.S. Cl.
CPC ............... *G08G 3/02* (2013.01); *B63H 21/21* (2013.01); *B63H 25/04* (2013.01); *G05D 1/0206* (2013.01); *B63H 2021/216* (2013.01)

(58) Field of Classification Search
CPC ................................... G08G 3/02; B63H 25/04
See application file for complete search history.

(56) References Cited

U.S. PATENT DOCUMENTS

| | | | |
|---|---|---|---|
| 2016/0101838 A1 | 4/2016 | Kojima | |
| 2020/0110412 A1* | 4/2020 | Nydahl | ................... B63B 49/00 |
| 2023/0073225 A1* | 3/2023 | Chan | ......................... G08G 3/02 |
| 2023/0406461 A1* | 12/2023 | Uoshita | ................... B63B 49/00 |

FOREIGN PATENT DOCUMENTS

JP          2016-080432 A      5/2016

* cited by examiner

*Primary Examiner* — Aaron L Troost
(74) *Attorney, Agent, or Firm* — Keating & Bennett, LLP

(57)          ABSTRACT

A navigation control system includes an obstacle detector on a hull to detect a distance from a hull to an obstacle on a water surface and a position of the obstacle. The navigation control system further includes a thruster on the hull to generate a propulsive force, a steering to steer the thruster to right and left sides of the hull, and a controller. The controller is configured or programmed to perform a control to determine an obstacle avoidance route based on a route function including at least an indicator of a lateral acceleration that acts on the hull during steering of the thruster when the obstacle is detected by the obstacle detector.

19 Claims, 3 Drawing Sheets

| | | STEERING ANGLE | | | | |
|---|---|---|---|---|---|---|
| | | ~10 deg | ~5 deg | 0 deg | 5 deg | 10 deg |
| PRO-PUL-SIVE FORCE | 4000 N | TURNING RADIUS: SMALL | ← | ∞ | → | TURNING RADIUS: SMALL |
| | 6000 N | ↑ | ↓ | ∞ | ↓ | ↑ |
| | 8000 N | → | TURNING RADIUS: LARGE | ∞ | TURNING RADIUS: LARGE | ← |

SMALL ← TURNING RADIUS → LARGE

| | | STEERING ANGLE | | | | |
|---|---|---|---|---|---|---|
| | | −10 deg | −5 deg | 0 deg | 5 deg | 10 deg |
| PRO-PUL-SIVE FORCE | 4000 N | TURNING RADIUS: SMALL | ← | ∞ | → | TURNING RADIUS: SMALL |
| | 6000 N | ↑ | ↓ | ∞ | ↓ | ↑ |
| | 8000 N | → | TURNING RADIUS: LARGE | ∞ | TURNING RADIUS: LARGE | ← |

SMALL ← TURNING RADIUS → LARGE

OBSTACLE PROXIMITY VALUE

1

5      20

DISTANCE BETWEEN OBSTACLE AND HULL [m]

*FIG.5*

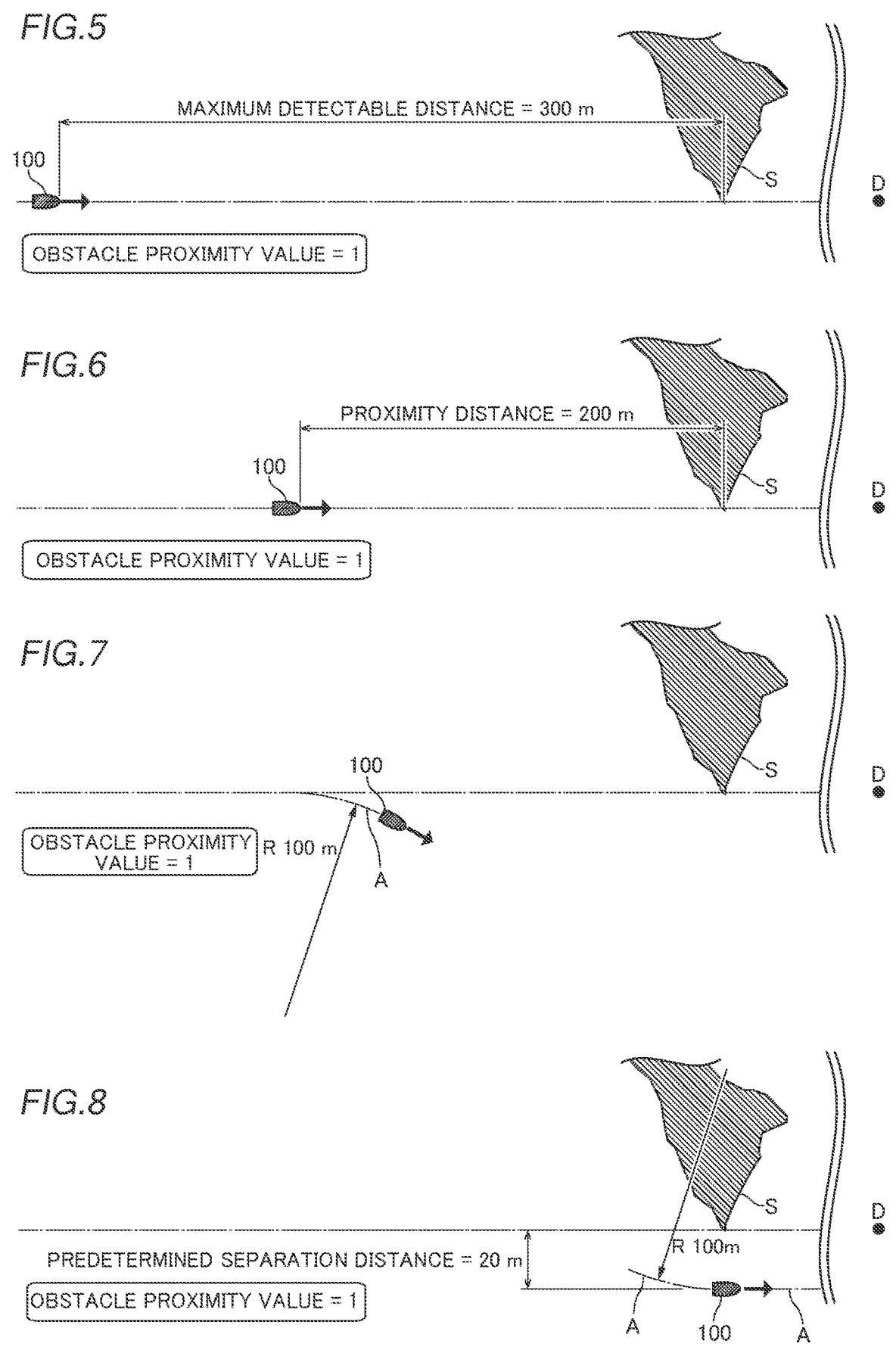

MAXIMUM DETECTABLE DISTANCE = 300 m

100

S

D

OBSTACLE PROXIMITY VALUE = 1

*FIG.6*

PROXIMITY DISTANCE = 200 m

100

S

D

OBSTACLE PROXIMITY VALUE = 1

OBSTACLE PROXIMITY VALUE = 1

PREDETERMINED SEPARATION DISTANCE = 20 m

OBSTACLE PROXIMITY VALUE = 1

A    100    A

NAVIGATION CONTROL SYSTEM AND MARINE VESSEL

CROSS REFERENCE TO RELATED APPLICATIONS

This application claims the benefit of priority to Japanese Patent Application No. 2022-174350 filed on Oct. 31, 2022. The entire contents of this application are hereby incorporated herein by reference.

BACKGROUND OF THE INVENTION

1. Field of the Invention

The present invention relates to a navigation control system and a marine vessel.

2. Description of the Related Art

A navigation control system and a marine vessel each including a controller to generate an obstacle avoidance route are known in general. Such a navigation control system and a marine vessel are disclosed in Japanese Patent Laid-Open No. 2016-080432, for example.

Japanese Patent Laid-Open No. 2016-080432 discloses a navigation route generation device provided on a hull and including an obstacle detector to detect an obstacle, and a controller to generate an avoidance route to avoid the obstacle detected by the obstacle detector. A marine vessel is steered along the generated avoidance route to avoid the obstacle.

Although not clearly described in Japanese Patent Laid-Open No. 2016-080432, a lateral acceleration acts on the hull when the marine vessel is steered. In such a case, the passenger of the marine vessel also experiences the lateral acceleration and sways to the left or right of the hull, and thus the passenger of the marine vessel feels discomfort due to a lateral load. When such a lateral acceleration is considered in the navigation route generation device described in Japanese Patent Laid-Open No. 2016-080432, it is conceivable that obstacle avoidance is prioritized, and a relatively large lateral acceleration acts on the hull. Thus, it is desired to reduce discomfort due to a lateral load.

SUMMARY OF THE INVENTION

Preferred embodiments of the present invention provide navigation control systems and marine vessels that reduce discomfort due to lateral loads.

A navigation control system according to a preferred embodiment of the present invention includes an obstacle detector on a hull to detect a distance from the hull to an obstacle on a water surface and a position of the obstacle, a thruster on the hull to generate a propulsive force, a steering to steer the thruster to right and left sides of the hull, and a controller configured or programmed to perform a control to determine an obstacle avoidance route based on a route function including at least an indicator of a lateral acceleration that acts on the hull during steering of the thruster when the obstacle is detected by the obstacle detector.

A navigation control system according to a preferred embodiment of the present invention includes the controller configured or programmed to perform a control to determine the obstacle avoidance route based on the route function including at least the indicator of the lateral acceleration that acts on the hull during steering of the thruster when the obstacle is detected by the obstacle detector. Accordingly, the route function that is the basis for determining the avoidance route includes the indicator of the lateral acceleration that acts on the hull during the steering of the thruster, and thus unlike the conventional case, the obstacle is avoided while taking into consideration the lateral acceleration that acts on the hull instead of simply avoiding the obstacle without taking lateral acceleration into consideration. Consequently, the avoidance route is determined to reduce or prevent the lateral acceleration of the hull by taking into consideration the lateral acceleration of the hull, and thus discomfort due to a lateral load is reduced.

In a navigation control system according to a preferred embodiment of the present invention, the controller is preferably configured or programmed to perform a control to, using a predictive indicator of a magnitude of the lateral acceleration expected to act on the hull during the steering of the thruster as the indicator of the lateral acceleration, determine the obstacle avoidance route based on the route function including at least the predictive indicator of the magnitude of the lateral acceleration. Accordingly, when the avoidance route is determined, the predictive indicator of the magnitude of the lateral acceleration expected to act on the hull during the steering of the thruster is taken into consideration as the indicator of the lateral acceleration, and thus the avoidance route to reduce or prevent the lateral acceleration of the hull is determined by accurately acquiring the lateral acceleration that acts on the hull. Consequently, discomfort due to a lateral load is effectively reduced.

In a navigation control system according to a preferred embodiment of the present invention, the controller is preferably configured or programmed to perform a control to determine the obstacle avoidance route based on the route function including an obstacle proximity value corresponding to an indicator that increases as the distance from the hull to the obstacle decreases, in addition to the indicator of the lateral acceleration. Accordingly, the obstacle proximity value corresponding to the indicator that increases as the distance from the hull to the obstacle decreases is taken into consideration in addition to the indicator of the lateral acceleration. Therefore, the distance from the hull to the obstacle is maintained such that the obstacle and the hull are not in proximity to each other, and discomfort due to a lateral load is reduced.

In a navigation control system according to a preferred embodiment of the present invention, the controller is preferably configured or programmed to perform a control to cause a marine vessel to automatically navigate toward a set destination, and determine the obstacle avoidance route based on the route function including an indicator of a navigation time to the set destination, in addition to the indicator of the lateral acceleration. Accordingly, the indicator of the navigation time to the destination is taken into consideration in addition to the indicator of the lateral acceleration. Therefore, an increase in the navigation time to the destination due to avoidance of the obstacle is reduced or prevented, and discomfort due to a lateral load is reduced or prevented.

In a navigation control system including the controller configured or programmed to perform a control to determine the obstacle avoidance route based on the route function including at least the predictive indicator of the magnitude of the lateral acceleration, the controller is preferably configured or programmed to perform a control to determine the obstacle avoidance route based on the route function including at least an integrated value of the lateral acceleration during the steering of the thruster corresponding to the predictive indicator of the magnitude of the lateral acceleration. Accordingly, when the avoidance route is determined, the integrated value of the lateral acceleration during the steering of the thruster is taken into consideration as the predictive indicator, and thus the avoidance route to reduce or prevent the lateral acceleration of the hull is determined taking into consideration the duration of the lateral acceleration. Consequently, discomfort due to a lateral load is more effectively reduced or prevented.

In a navigation control system including the controller configured or programmed to perform a control to determine the obstacle avoidance route based on the route function including at least the predictive indicator of the magnitude of the lateral acceleration, the controller is preferably configured or programmed to perform a control to determine the obstacle avoidance route based on the route function including at least a maximum value of the lateral acceleration during the steering of the thruster corresponding to the predictive indicator of the magnitude of the lateral acceleration. Accordingly, the maximum value of the lateral acceleration during the steering of the thruster is taken into consideration as the predictive indicator, and thus maximum right-left sway that the passenger of the marine vessel receives is reduced. Consequently, discomfort due to a lateral load is reduced or prevented.

In a navigation control system including the controller configured or programmed to perform a control to determine the obstacle avoidance route based on the route function including the obstacle proximity value, the controller is preferably configured or programmed to perform a control to set the obstacle proximity value to a predetermined minimum proximity value when the distance from the hull to the obstacle is equal to or greater than a predetermined separation distance, and determine the obstacle avoidance route based on the route function such that the distance from the hull to the obstacle is maintained at the predetermined separation distance or greater, and the obstacle proximity value is maintained at the predetermined minimum proximity value. Accordingly, the obstacle proximity value is maintained at the predetermined minimum proximity value at which the distance from the hull to the obstacle is maintained at the predetermined separation distance or greater. Consequently, the distance from the hull to the obstacle is easily maintained such that the obstacle and the hull are not in proximity to each other.

In a navigation control system according to a preferred embodiment of the present invention, the controller is preferably configured or programmed to start a control to determine the obstacle avoidance route based on the route function including at least the indicator of the lateral acceleration when the hull approaches the obstacle to a position at which the distance from the hull to the obstacle is a predetermined proximity distance smaller than a maximum detectable distance to the obstacle that is detectable by the obstacle detector. Accordingly, the control to determine the obstacle avoidance route is started when the hull approaches the obstacle to the predetermined proximity distance smaller than the maximum detectable distance, not a distance at which the obstacle detector starts to detect the obstacle (a maximum distance at which the obstacle is detectable), and thus the obstacle detector accurately detects the distance from the hull to the obstacle when the control to determine the obstacle avoidance route is started.

A navigation control system according to a preferred embodiment of the present invention preferably further includes a storage to store a map or a table showing a relationship between a magnitude of a steering angle, a magnitude of the propulsive force, and a turning radius, and the controller is preferably configured or programmed to perform a control to determine the obstacle avoidance route based on the route function including at least the indicator of the lateral acceleration and the map or the table. Accordingly, the controller easily acquires the relationship between the magnitude of the steering angle, the magnitude of the propulsive force, and the turning radius from the map or the table stored in the storage.

In a navigation control system according to a preferred embodiment of the present invention, the controller is preferably configured or programmed to perform a control to cause the hull to travel straight after sequentially making a clockwise or counterclockwise turn of the hull and a counterclockwise or clockwise turn of the hull when determining the obstacle avoidance route. Accordingly, the clockwise and counterclockwise turns are alternately repeated, and thus when the hull moves along the avoidance route, the bow is turned to the destination again.

In a navigation control system according to a preferred embodiment of the present invention, the obstacle detector preferably includes a stereo camera or a photodetector operable to acquire the distance from the hull to the obstacle by detecting the obstacle with light. Accordingly, the distance from the hull to the obstacle is accurately and easily detected by the stereo camera or the photodetector.

In a navigation control system according to a preferred embodiment of the present invention, the controller is preferably configured or programmed to perform a control to determine the obstacle avoidance route so as to minimize the route function including at least the indicator of the lateral acceleration. Accordingly, the route function is minimized, and thus the optimum obstacle avoidance route is determined taking into consideration the balance of each indicator included in the route function, such as the indicator of the lateral acceleration.

A marine vessel according to a preferred embodiment of the present invention includes a hull, and a navigation control system on or in the hull. The navigation control system includes an obstacle detector on the hull to detect a distance from the hull to an obstacle on a water surface and a position of the obstacle, a thruster on the hull to generate a propulsive force, a steering to steer the thruster to right and left sides of the hull, and a controller configured or programmed to perform a control to determine an obstacle avoidance route based on a route function including at least an indicator of a lateral acceleration that acts on the hull during steering of the thruster when the obstacle is detected by the obstacle detector.

A marine vessel according to a preferred embodiment of the present invention includes the controller configured or programmed to perform a control to determine the obstacle avoidance route based on the route function including at least the indicator of the lateral acceleration that acts on the hull during steering of the thruster when the obstacle is detected by the obstacle detector. Accordingly, the route function that is the basis for determining the avoidance route includes the indicator of the lateral acceleration that acts on the hull during the steering of the thruster, and thus unlike the conventional case, the obstacle is avoided while taking into consideration the lateral acceleration that acts on the hull instead of simply avoiding the obstacle without taking lateral acceleration into consideration. Consequently, the avoidance route is determined to reduce or prevent the lateral acceleration of the hull taking into consideration the lateral acceleration of the hull, and thus discomfort due to a lateral load is reduced.

In a marine vessel according to a preferred embodiment of the present invention, the controller is preferably configured or programmed to perform a control to, using a predictive indicator of a magnitude of the lateral acceleration expected to act on the hull during the steering of the thruster as the indicator of the lateral acceleration, determine the obstacle avoidance route based on the route function including at least the predictive indicator of the magnitude of the lateral acceleration. Accordingly, when the avoidance route is determined, the predictive indicator of the magnitude of the lateral acceleration expected to act on the hull during the steering of the thruster is taken into consideration as the indicator of the lateral acceleration, and thus the avoidance route to reduce or prevent the lateral acceleration of the hull is determined by accurately acquiring the lateral acceleration that acts on the hull. Consequently, discomfort due to a lateral load is effectively reduced.

In a marine vessel according to a preferred embodiment of the present invention, the controller is preferably configured or programmed to perform a control to determine the obstacle avoidance route based on the route function including an obstacle proximity value corresponding to an indicator that increases as the distance from the hull to the obstacle decreases, in addition to the indicator of the lateral acceleration. Accordingly, the obstacle proximity value corresponding to the indicator that increases as the distance from the hull to the obstacle decreases is taken into consideration in addition to the indicator of the lateral acceleration. Therefore, the distance from the hull to the obstacle is maintained such that the obstacle and the hull are not in proximity to each other, and discomfort due to a lateral load is reduced.

In a marine vessel according to a preferred embodiment of the present invention, the controller is preferably configured or programmed to perform a control to cause a marine vessel to automatically navigate toward a set destination, and determine the obstacle avoidance route based on the route function including an indicator of a navigation time to the set destination, in addition to the indicator of the lateral acceleration. Accordingly, the indicator of the navigation time to the destination is taken into consideration in addition to the indicator of the lateral acceleration. Therefore, an increase in the navigation time to the destination due to avoidance of the obstacle is reduced or prevented, and discomfort due to a lateral load is reduced.

In a marine vessel including the controller configured or programmed to perform a control to determine the obstacle avoidance route based on the route function including at least the predictive indicator of the magnitude of the lateral acceleration, the controller is preferably configured or programmed to perform a control to determine the obstacle avoidance route based on the route function including at least an integrated value of the lateral acceleration during the steering of the thruster corresponding to the predictive indicator of the magnitude of the lateral acceleration. Accordingly, when the avoidance route is determined, the integrated value of the lateral acceleration during the steering of the thruster is taken into consideration as the predictive indicator, and thus the avoidance route to reduce or prevent the lateral acceleration of the hull is determined taking into consideration the duration of the lateral acceleration. Consequently, discomfort due to a lateral load is more effectively reduced.

In a marine vessel including the controller configured or programmed to perform a control to determine the obstacle avoidance route based on the route function including at least the predictive indicator of the magnitude of the lateral acceleration, the controller is preferably configured or programmed to perform a control to determine the obstacle avoidance route based on the route function including at least a maximum value of the lateral acceleration during the steering of the thruster corresponding to the predictive indicator of the magnitude of the lateral acceleration. Accordingly, the maximum value of the lateral acceleration during the steering of the thruster is taken into consideration as the predictive indicator, and thus maximum right-left sway that the passenger of the marine vessel receives is reduced. Consequently, discomfort due to a lateral load is reduced.

In a marine vessel including the controller configured or programmed to perform a control to determine the obstacle avoidance route based on the route function including the obstacle proximity value, the controller is preferably configured or programmed to perform a control to set the obstacle proximity value to a predetermined minimum proximity value when the distance from the hull to the obstacle is equal to or greater than a predetermined separation distance, and determine the obstacle avoidance route based on the route function such that the distance from the hull to the obstacle is maintained at the predetermined separation distance or greater, and the obstacle proximity value is maintained at the predetermined minimum proximity value. Accordingly, the obstacle proximity value is maintained at the predetermined minimum proximity value at which the distance from the hull to the obstacle is maintained at the predetermined separation distance or greater. Consequently, the distance from the hull to the obstacle is easily maintained such that the obstacle and the hull are not in proximity to each other.

In a marine vessel according to a preferred embodiment of the present invention, the controller is preferably configured or programmed to start a control to determine the obstacle avoidance route based on the route function including at least the indicator of the lateral acceleration when the hull approaches the obstacle to a position at which the distance from the hull to the obstacle is a predetermined proximity distance smaller than a maximum detectable distance to the obstacle that is detectable by the obstacle detector. Accordingly, the control to determine the obstacle avoidance route is started when the hull approaches the obstacle to the predetermined proximity distance smaller than the maximum detectable distance, not a distance at which the obstacle detector starts to detect the obstacle (a maximum distance at which the obstacle is detectable), and thus the obstacle detector accurately detects the distance from the hull to the obstacle when the control to determine the obstacle avoidance route is started.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a diagram illustrating an example of an obstacle avoidance route determined by a controller, and showing a state in which a distance between a marine vessel and an obstacle is a maximum detectable distance according to a preferred embodiment of the present invention.

FIG. 6 is a diagram illustrating an example of an obstacle avoidance route determined by a controller, and showing a state subsequent to the state of FIG. 5.

FIG. 7 is a diagram illustrating an example of an obstacle avoidance route determined by a controller, and showing a state in which a marine vessel turns clockwise, subsequent to the state of FIG. 6.

FIG. 8 is a diagram illustrating an example of an obstacle avoidance route determined by a controller, and showing a state in which a marine vessel turns counterclockwise, subsequent to the state of FIG. 7.

DETAILED DESCRIPTION OF THE
PREFERRED EMBODIMENTS

Preferred embodiments of the present invention are hereinafter described with reference to the drawings.

The structure of a marine vessel 100 including a navigation control system 102 according to preferred embodiments of the present invention is now described with reference to FIGS. 1 to 8.

In the figures, arrow FWD represents the forward movement direction of the marine vessel 100, and arrow BWD represents the reverse movement direction of the marine vessel 100. Arrow R represents the starboard direction of the marine vessel 100, and arrow L represents the portside direction of the marine vessel 100.

The marine vessel 100 includes a hull 101 and the navigation control system 102 on or in the hull 101.

The marine vessel 100 is a relatively small marine vessel that does not include an automatic identification system (AIS). The AIS is a system to mutually exchange navigational information between marine vessels navigating on the water in the same vicinity. That is, the marine vessel 100 is not able to avoid an obstacle S (see FIGS. 5 to 8) from an early stage by using the AIS.

Figure 1:
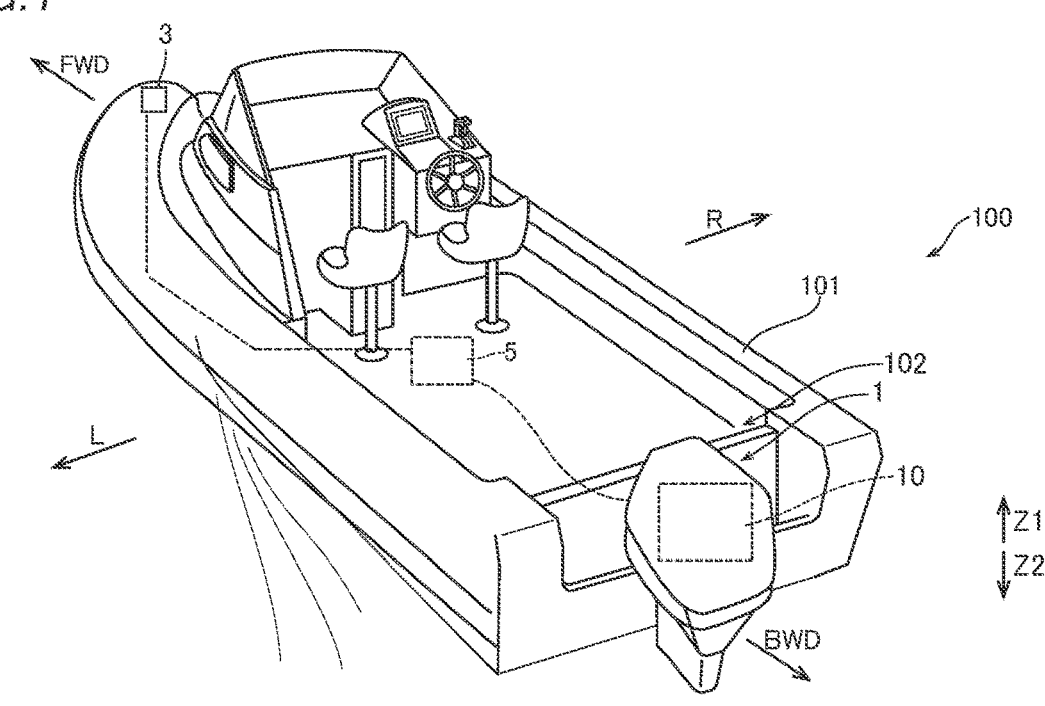
FIG. 1 is a perspective view showing a marine vessel including a navigation control system according to a preferred embodiment of the present invention.
Figure 2:
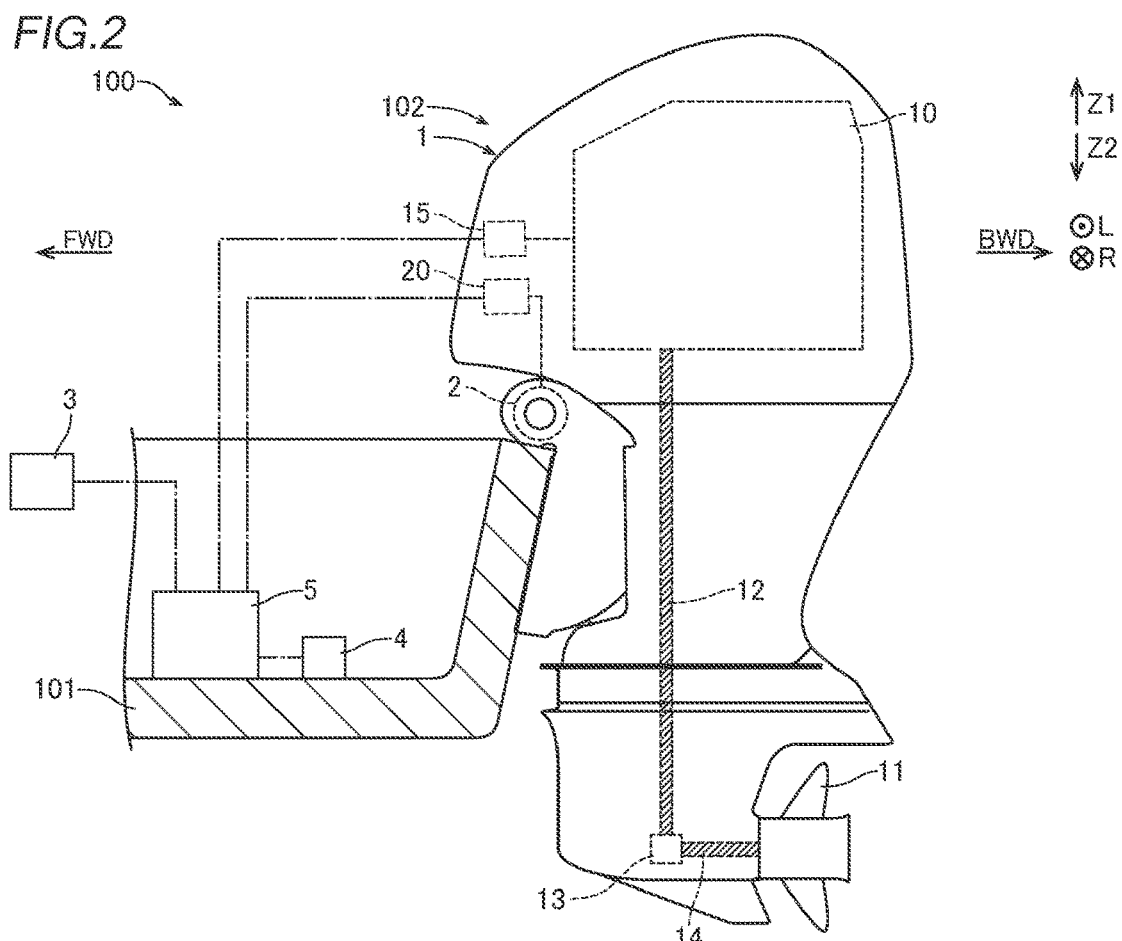
FIG. 2 is a side view showing a marine vessel including a navigation control system according to a preferred embodiment of the present invention.

The marine vessel 100, including a controller 5 of the navigation control system 102, shown in FIGS. 1 and 2 performs a control to determine an obstacle S avoidance route A (see FIGS. 7 and 8) when there is the obstacle S on the water surface. The marine vessel 100, including the controller 5 of the navigation control system 102, automatically maneuvers along the determined obstacle S avoidance route A, that is, performs an obstacle avoidance control. The controller of the navigation control system may simply prompt a user to maneuver the marine vessel along the determined obstacle avoidance route, instead of automatically maneuvering the marine vessel. The obstacle avoidance control performed by the controller 5 is described below in detail.

The marine vessel 100 also includes a position information acquirer (not shown). As an example, the position information acquirer performs a global positioning system (GPS) function. The marine vessel 100 acquires the current position and speed of the hull 101, for example, with the position information acquirer.

The navigation control system 102 includes a thruster 1, a steering mechanism 2, an obstacle detector 3, a storage 4 that stores information used to determine the avoidance route A, and the controller 5 that determines the avoidance route A.

As an example, the controller 5 includes a control circuit including a central processing unit (CPU) and a memory, and is a so-called boat control unit (BCU) that performs various automatic marine vessel maneuvering controls. The various automatic marine vessel maneuvering controls include a control to automatically hold the position of the hull 101, a control to automatically navigate while maintaining the orientation of the hull 101, and a control to automatically navigate toward a destination D set by the user, for example.

As an automatic marine vessel maneuvering control, the controller 5 determines the obstacle S avoidance route A and performs a control to automatically maneuver the marine vessel 100 along the determined obstacle S avoidance route A (the obstacle avoidance control). The navigation control system 102 switches on and off states of the obstacle avoidance control in response to a predetermined operation on an operator.

The thruster 1 is an outboard motor attached to a transom of the hull 101. Only one thruster 1 is provided on the hull 101. The thruster 1 includes an engine 10 and a propeller 11 rotated by the driving force of the engine 10. The thruster 1 rotates a drive shaft 12 by driving the engine 10 to generate a torque. The thruster 1 transmits a torque from the drive shaft 12 to a propeller shaft 14 via a gear unit 13 to rotate the propeller 11 together with the propeller shaft 14.

The thruster 1 includes an engine control unit (ECU) 15, and driving of the engine 10 is controlled under the control of the engine control unit 15. The engine control unit 15 includes a control circuit including a CPU and a memory. When an automatic marine vessel maneuvering mode executed by the controller 5, which is the boat control unit, is on, the engine control unit 15 controls driving of the thruster 1 based on a drive signal from the controller 5. Consequently, the magnitude of a propulsive force, for example, is adjusted.

The steering mechanism 2 steers the thruster 1 with respect to a center line of the hull 101 in a right-left direction. The steering mechanism 2 includes a steering control unit (SCU) 20, and driving of the steering mechanism 2 is controlled under the control of the steering control unit 20. The steering control unit 20 includes a control circuit including a CPU and a memory. When the automatic marine vessel maneuvering mode is on, the steering control unit 20 controls steering of the thruster 1 based on a drive signal from the controller 5. As an example, the steering mechanism 2 includes a steering shaft, a hydraulic cylinder that is hydraulically extended and retracted to rotate the steering shaft, etc.

The obstacle detector 3 detects a distance from the hull 101 to the obstacle S on the water surface and the position of the obstacle S. The obstacle detector 3 is provided on the hull 101. The obstacle detector 3 detects at least the obstacle S on the front side of the hull 101.

The obstacle detector 3 detects the obstacle S by so-called light detection and ranging (LiDAR). LiDAR is an object detection method to acquire a distance to an object by irradiating the object with near-infrared light, visible light, or ultraviolet light and detecting the reflected light with an optical sensor. The position and shape of an object are also able to be detected by LiDAR. As an example, a maximum detectable distance to the obstacle S that is detectable by the obstacle detector 3 is about 300 m.

The storage 4 stores a table 4*a* showing the relationship between the magnitude of a steering angle, the magnitude of a propulsive force, and a turning radius. The table 4*a* (see FIG. 3) stored in the storage 4 is used for the obstacle avoidance control performed by the controller 5.

The magnitude of the steering angle is adjusted by the steering mechanism 2. The steering angle refers to the inclination angle of the thruster 1 with respect to the center line of the hull 101 in the right-left direction in a plan view. The magnitude of the propulsive force is adjusted by the engine 10 of the thruster 1.

Figure 3:
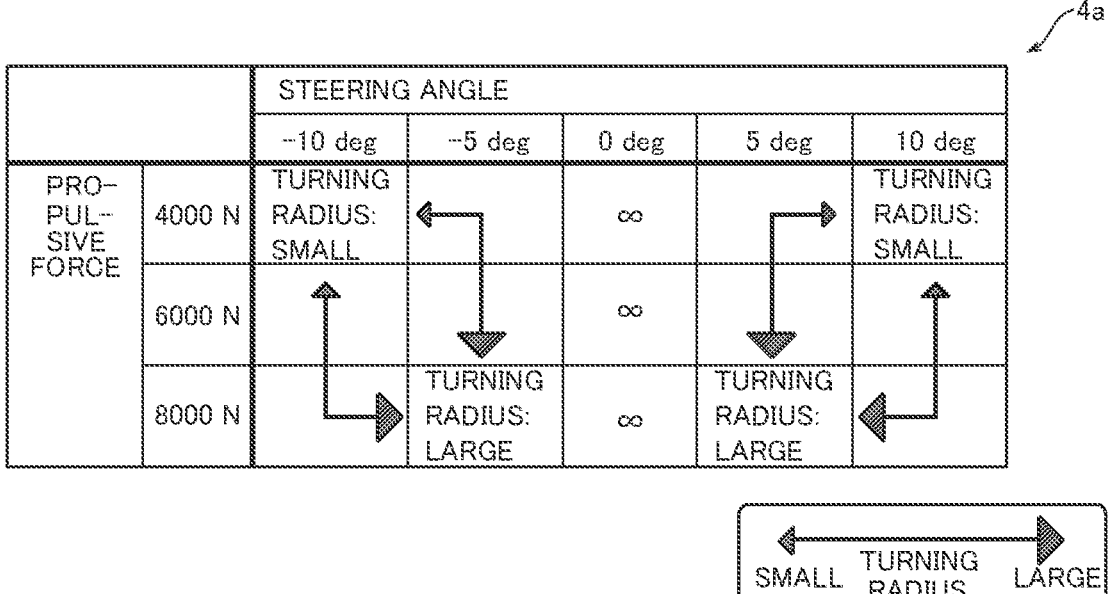
FIG. 3 is a diagram illustrating a relationship between a propulsive force of a thruster, a steering angle of the thruster, and a turning radius of a marine vessel according to a preferred embodiment of the present invention.

As an example, FIG. 3 shows the relationships between the steering angles of –10 degrees, –5 degrees, 0 degrees, 5 degrees, and 10 degrees, the propulsive forces of 4000 N, 6000 N, and 8000 N, and the turning radii. As the steering angle increases, the turning radius decreases. As the steering angle decreases, the turning radius increases. As the propulsive force increases, the turning radius increases. As the propulsive force decreases, the turning radius decreases. A specific value of the turning radius is set in advance taking into consideration the shape of the hull 101, for example.

The controller 5 shown in FIGS. 1 and 2 performs a control such that the marine vessel 100 automatically navigates to the destination D set by the user. The marine vessel 100 substantially linearly moves toward the destination D while directing its bow toward the destination D. The obstacle avoidance control is performed by the controller 5 when the marine vessel 100 automatically navigates toward the destination D. The obstacle avoidance control is described below. The obstacle avoidance control is performed taking into consideration route functions defined based on three indicators, for example. Below, the route functions are described after the three indicators are described in order.

First, a first indicator is described. When the obstacle detector 3 detects the obstacle S, the controller 5 performs a control to determine the obstacle S avoidance route A based on a route function including at least an indicator (first indicator) of a lateral acceleration (horizontal acceleration) that acts on the hull 101 during steering of the thruster 1.

The lateral acceleration refers to an acceleration that acts on a marine vessel in a right-left direction perpendicular to a forward-rearward direction of the marine vessel in a plan view when the marine vessel is turned (steered). The lateral acceleration always occurs when the marine vessel 100 is turned. When the marine vessel 100 travels straight, the lateral acceleration is zero. When the lateral acceleration occurs, the user sways in the right-left direction of the hull 101, and thus the lateral acceleration is preferably suppressed to a predetermined value or less. That is, the indicator (first indicator) of the lateral acceleration refers to an indicator that is taken into consideration in order to suppress the lateral acceleration received by the user to the predetermined value or less when the avoidance route A is set. As an example, the indicator (first indicator) of the lateral acceleration is set such that the lateral acceleration received by the user is at least 0.5 G or less.

Specifically, the controller 5 performs a control to, using a predictive indicator of the magnitude of the lateral acceleration expected to act on the hull 101 during steering of the thruster 1 as the indicator of the lateral acceleration, determine the obstacle S avoidance route A based on the route function including at least the predictive indicator of the magnitude of the lateral acceleration.

More specifically, the controller 5 performs a control to determine the obstacle S avoidance route A based on the route function including at least the integrated value of the lateral acceleration during steering of the thruster 1 corresponding to the predictive indicator of the magnitude of the lateral acceleration.

The controller 5 performs a control to determine the obstacle S avoidance route A based on the route function including at least the indicator of the lateral acceleration and the table 4*a*. That is, the controller 5 performs a control to relatively increase the turning radius so as to decrease the lateral acceleration by controlling driving of the steering mechanism 2 to adjust the steering angle and controlling driving of the engine 10 to adjust the magnitude of the propulsive force based on the table 4*a*. The controller 5 may control driving of only one of the steering mechanism 2 and the engine 10.

Figure 4:
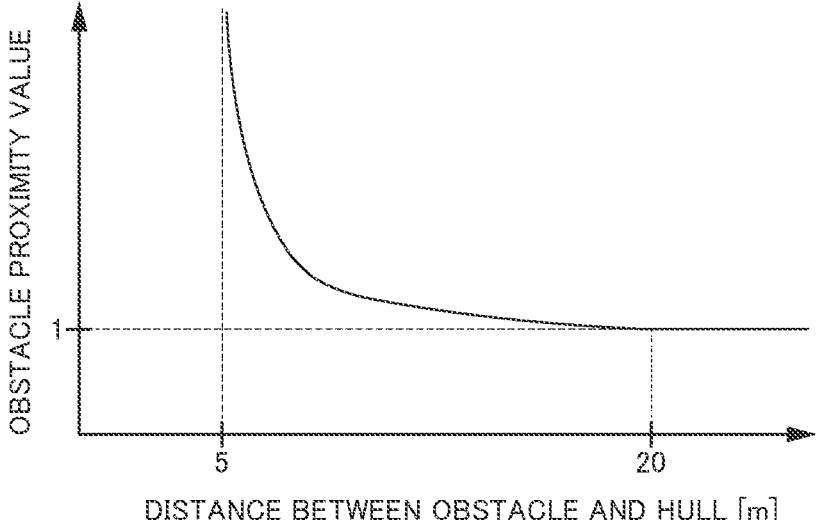
FIG. 4 is a diagram illustrating a relationship between a distance from a hull to an obstacle and an obstacle proximity value according to a preferred embodiment of the present invention.

Next, a second indicator is described with reference to FIG. 4. The controller 5 performs a control to determine the obstacle S avoidance route A based on a route function including an obstacle proximity value (second indicator) corresponding to an indicator that increases as a distance from the hull 101 to the obstacle S decreases, in addition to the indicator of the lateral acceleration described above. The obstacle proximity value is an indicator of the degree of proximity between the obstacle S and the hull 101. The obstacle proximity value is equal to or greater than 1, and increases as the degree of proximity between the obstacle S and the hull 101 increases. The obstacle proximity value (second indicator) is an indicator that is taken into consideration in order to maintain a distance from the hull 101 to the obstacle S and prevent the obstacle S and the hull 101 from approaching each other.

The controller 5 performs a control to set the obstacle proximity value to a predetermined minimum proximity value when the distance from the hull 101 to the obstacle S is equal to or greater than a predetermined separation distance, and determine the obstacle S avoidance route A based on the route function such that the distance from the hull 101 to the obstacle S is maintained at the predetermined separation distance or greater, and the obstacle proximity value is maintained at the predetermined minimum proximity value.

As an example, the obstacle proximity value is always 1 when the distance from the hull 101 to the obstacle S is 20 m or more. That is, the predetermined separation distance is 20 m. The minimum proximity value is 1. Therefore, the marine vessel 100 navigates along the avoidance route A while maintaining a distance of at least 20 m between the obstacle S and the hull 101. When the distance from the hull 101 to the obstacle S is less than 20 m, the obstacle proximity value increases as the distance decreases. The obstacle proximity value diverges to take an extremely large value when the distance from the hull 101 to the obstacle S is about 5 m.

The controller 5 starts a control to determine the obstacle S avoidance route A based on the route function including at least the indicator of the lateral acceleration when the hull 101 approaches the obstacle S to a position at which the distance from the hull 101 to the obstacle S is a predetermined proximity distance smaller than the maximum detectable distance to the obstacle S that is detectable by the obstacle detector 3.

The proximity distance refers to a predetermined distance from the hull 101 to the obstacle S when the obstacle proximity value is 1 as a minimum requirement. That is, the proximity distance is a predetermined distance of 20 m or more. As an example, the maximum detectable distance is 300 m as described above, and in such a case, the proximity distance is 200 m.

Next, a third indicator is described. The controller 5 performs a control to determine the obstacle S avoidance route A based on a route function including an indicator (third indicator) indicating the navigation time to the destination D, in addition to the indicator of the lateral acceleration. The indicator (third indicator) indicating the navigation time to the destination D refers to an indicator to reduce or prevent an excessive increase in the navigation time to the destination D as compared with the original route to the destination D before the avoidance route A is set when the marine vessel 100 navigates along the determined avoidance route A.

As an example, the indicator of the navigation time to the destination D corresponds to the navigation time required for the marine vessel 100 to reach the destination D from its current location when the marine vessel 100 navigates along the avoidance route A. In the avoidance route A, the degree of proximity to the obstacle S decreases as the distance from the hull 101 to the obstacle S increases, and in such a case, the navigation time to the destination D becomes longer than necessary. Therefore, as an example, the controller 5 performs a control to determine the avoidance route A such that the distance from the hull 101 to the obstacle S is maintained at the predetermined separation distance (20 m, for example) when the hull 101 is closest to the obstacle S.

The route function including the three indicators (the first indicator, the second indicator, and the third indicator) is expressed as the following formula:

route function=(indicator of lateral acceleration)× (obstacle proximity value)×(indicator of navigation time to destination D)

Specifically, the route function is expressed as the following formula:

route function=(absolute value of "integrated value of lateral acceleration during steering of thruster corresponding to predictive indicator of magnitude of lateral acceleration"+1)×(obstacle proximity value)×(navigation time to destination D)

In the route function, at least one of the three indicators may be multiplied by a predetermined coefficient in order to adjust the weighting (importance or priority) of the three indicators.

The controller 5 performs a control to determine the obstacle S avoidance route A so as to minimize the route function including at least the indicator of the lateral acceleration. Specifically, as in the above formula for the route function, the controller 5 performs a control to determine the obstacle S avoidance route A so as to minimize the route function including the three indicators including the indicator of the lateral acceleration, the obstacle proximity value, and the navigation time to the destination D. Furthermore, the controller 5 sets a predetermined upper limit value for each of the above three indicators, and determines the avoidance route A.

The controller 5 performs a control to cause the hull 101 to travel straight after sequentially making a clockwise or counterclockwise turn (steering) of the hull 101 and a counterclockwise or clockwise turn of the hull 101 when determining the obstacle S avoidance route A. Marine vessels have a rule of navigation to the right. Therefore, in principle, the controller 5 causes the hull 101 to travel straight toward the destination D after sequentially making a clockwise turn of the hull 101 and a counterclockwise turn of the hull 101 (after turning the hull 101 to the right) when determining the obstacle S avoidance route A.

An example of the obstacle S avoidance route A determined by the controller 5 is now described with reference to FIGS. 5 to 8.

A case in which the marine vessel 100 is navigating toward the obstacle S, which is land, is described below.

As shown in FIG. 5, the obstacle S is detected by the obstacle detector 3 when the distance between the marine vessel 100 and the obstacle S is decreased to 300 m. Consequently, the controller 5 recognizes the obstacle S.

Then, as shown in FIG. 6, the controller 5 starts a control to determine the obstacle S avoidance route A when the hull 101 approaches the obstacle S to the position at which the distance from the hull 101 to the obstacle S is the proximity distance (200 m, for example). The obstacle proximity value for determining the avoidance route A is 1. Furthermore, the controller 5 adjusts the propulsive force and the steering angle, taking into consideration the table 4a, and sets the turning radius to a relatively large value such that the integrated value of the lateral acceleration becomes small (not too large).

As a specific example, as shown in FIG. 7, both the clockwise and counterclockwise turning radii are set to 100 m. A linear movement may intervene between the clockwise turning and the counterclockwise turning.

The controller 5 determines the shortest avoidance route A within a range in which the obstacle proximity value is maintained at 1 such that the navigation time to the destination D does not become too long.

As a specific example, as shown in FIG. 8, the controller 5 determines the avoidance route A such that the distance from the hull 101 to the obstacle S is maintained at the predetermined separation distance (20 m, for example) when the hull 101 is closest to the obstacle S. That is, the controller 5 determines the avoidance route A such that the distance from the hull 101 to the obstacle S is equal to the predetermined separation distance (20 m, for example) in a direction perpendicular to the heading before turning of the hull 101 in a plan view when a clockwise turn and a counterclockwise turn are completed. Furthermore, the controller 5 determines the avoidance route A such that the heading is toward the destination D when a clockwise turn and a counterclockwise turn are completed.

Then, the controller 5 starts automatic marine vessel maneuvering along the determined obstacle S avoidance route A immediately after determining the avoidance route A. The controller 5 repeatedly performs a calculation at a predetermined time interval (0.1 second interval, for example) to determine the avoidance route A even after determining the avoidance route A. Thus, the controller 5 corrects the avoidance route A such that the avoidance route A approaches an optimum route to avoid the obstacle S. FIGS. 7 and 8 show an example in which the avoidance route A is determined such that the marine vessel 100 navigates while turning to the right side of the hull 101 before turning, taking into consideration the shape of the land, which is the obstacle S. When the marine vessel 100 is able to avoid the obstacle by turning to the left side of the hull before turning, taking into consideration the shape of the land, which is the obstacle, the avoidance route may be determined such that the marine vessel navigates while turning to the left side of the hull before turning.

According to the various preferred embodiments of the present invention described above, the following advantageous effects are achieved.

According to a preferred embodiment of the present invention, the navigation control system 102 includes the controller 5 configured or programmed to perform a control to determine the obstacle S avoidance route A based on the route function including at least the indicator of the lateral acceleration that acts on the hull 101 during steering of the thruster 1 when the obstacle S is detected by the obstacle detector 3. Accordingly, the route function that is the basis for determining the avoidance route A includes the indicator of the lateral acceleration that acts on the hull 101 during steering of the thruster 1, and thus unlike the conventional case, the obstacle S is avoided while taking into consideration the lateral acceleration that acts on the hull 101 instead of simply avoiding the obstacle S without taking lateral acceleration into consideration. Consequently, the avoidance route A is determined to reduce or prevent the lateral acceleration of the hull 101, taking into consideration the lateral acceleration of the hull 101, and thus discomfort due to a lateral load is reduced.

According to a preferred embodiment of the present invention, the controller 5 is configured or programmed to perform a control to, using the predictive indicator of the magnitude of the lateral acceleration expected to act on the hull 101 during steering of the thruster 1 as the indicator of the lateral acceleration, determine the obstacle S avoidance route A based on the route function including at least the predictive indicator of the magnitude of the lateral acceleration. Accordingly, when the avoidance route A is determined, the predictive indicator of the magnitude of the lateral acceleration expected to act on the hull 101 during steering of the thruster 1 is taken into consideration as the indicator of the lateral acceleration, and thus the avoidance route A to reduce or prevent the lateral acceleration of the hull 101 is determined by accurately acquiring the lateral acceleration that acts on the hull 101. Consequently, discomfort due to a lateral load is effectively reduced.

According to a preferred embodiment of the present invention, the controller 5 is configured or programmed to perform a control to determine the obstacle S avoidance route A based on the route function including the obstacle proximity value corresponding to the indicator that increases as the distance from the hull 101 to the obstacle S decreases, in addition to the indicator of the lateral acceleration. Accordingly, the obstacle proximity value corresponding to the indicator that increases as the distance from the hull 101 to the obstacle S decreases is taken into consideration in addition to the indicator of the lateral acceleration. Therefore, the distance from the hull 101 to the obstacle S is maintained such that the obstacle S and the hull 101 are not in proximity to each other, and discomfort due to a lateral load is reduced.

According to a preferred embodiment of the present invention, the controller 5 is configured or programmed to perform a control to cause the marine vessel 100 to automatically navigate toward the set destination D, and to perform a control to determine the obstacle S avoidance route A based on the route function including the indicator of the navigation time to the destination D, in addition to the indicator of the lateral acceleration. Accordingly, the indicator of the navigation time to the destination D is taken into consideration in addition to the indicator of the lateral acceleration. Therefore, an increase in the navigation time to the destination D due to avoidance of the obstacle S is reduced or prevented, and discomfort due to a lateral load is reduced.

According to a preferred embodiment of the present invention, the controller 5 is configured or programmed to perform a control to determine the obstacle S avoidance route A based on the route function including at least the integrated value of the lateral acceleration during steering of the thruster 1 corresponding to the predictive indicator of the magnitude of the lateral acceleration. Accordingly, when the avoidance route A is determined, the integrated value of the lateral acceleration during steering of the thruster 1 is taken into consideration as the predictive indicator, and thus the avoidance route A to reduce or prevent the lateral acceleration of the hull 101 is determined taking into consideration the duration of the lateral acceleration. Consequently, discomfort due to a lateral load is more effectively reduced.

According to a preferred embodiment of the present invention, the controller 5 is configured or programmed to perform a control to set the obstacle proximity value to the predetermined minimum proximity value when the distance from the hull 101 to the obstacle S is equal to or greater than the predetermined separation distance, and determine the obstacle S avoidance route A based on the route function such that the distance from the hull 101 to the obstacle S is maintained at the predetermined separation distance or greater, and the obstacle proximity value is maintained at the predetermined minimum proximity value. Accordingly, the obstacle proximity value is maintained at the predetermined minimum proximity value at which the distance from the hull 101 to the obstacle S is maintained at the predetermined separation distance or greater. Consequently, the distance from the hull 101 to the obstacle S is easily maintained such that the obstacle S and the hull 101 are not in proximity to each other.

According to a preferred embodiment of the present invention, the controller 5 is configured or programmed to start a control to determine the obstacle S avoidance route A based on the route function including at least the indicator of the lateral acceleration when the hull 101 approaches the obstacle S to the position at which the distance from the hull 101 to the obstacle S is the predetermined proximity distance smaller than the maximum detectable distance to the obstacle S that is detectable by the obstacle detector 3. Accordingly, the control to determine the obstacle S avoidance route A is started when the hull 101 approaches the obstacle S to the predetermined proximity distance smaller than the maximum detectable distance, not a distance at which the obstacle detector 3 starts to detect the obstacle S (a maximum distance at which the obstacle S is detectable), and thus the obstacle detector 3 accurately detects the distance from the hull 101 to the obstacle S when the control to determine the obstacle S avoidance route A is started.

According to a preferred embodiment of the present invention, the navigation control system 102 further includes the storage 4 to store the table 4a showing the relationship between the magnitude of the steering angle, the magnitude of the propulsive force, and the turning radius, and the controller 5 is configured or programmed to perform a control to determine the obstacle S avoidance route A based on the route function including at least the indicator of the lateral acceleration and the table 4a. Accordingly, the controller 5 easily acquires the relationship between the magnitude of the steering angle, the magnitude of the propulsive force, and the turning radius from the table 4a stored in the storage 4.

According to a preferred embodiment of the present invention, the controller 5 is configured or programmed to perform a control to cause the hull 101 to travel straight after sequentially making a clockwise or counterclockwise turn of the hull 101 and a counterclockwise or clockwise turn of the hull 101 when determining the obstacle S avoidance route A. Accordingly, the clockwise and counterclockwise turns are alternately repeated, and thus when the hull 101 moves along the avoidance route A, the bow is turned to the destination D again.

According to a preferred embodiment of the present invention, the obstacle detector 3 includes a photodetector (using LiDAR) that acquires the distance from the hull 101 to the obstacle S by detecting the obstacle S with light. Accordingly, the distance from the hull 101 to the obstacle S is accurately and easily detected by the photodetector (using LiDAR).

According to a preferred embodiment of the present invention, the controller 5 is configured or programmed to perform a control to determine the obstacle S avoidance route A so as to minimize the route function including at least the indicator of the lateral acceleration. Accordingly, the route function is minimized, and thus the optimum obstacle S avoidance route A is determined taking into consideration the balance of each indicator included in the route function, such as the indicator of the lateral acceleration.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the obstacle detector preferably uses LiDAR in preferred embodiments described above, the present invention is not restricted to this. In a preferred embodiment of the present invention, the obstacle detector may alternatively be a stereo camera, for example.

While the thruster is preferably an outboard motor in preferred embodiments described above, the present invention is not restricted to this. In a preferred embodiment of the present invention, the thruster may alternatively be an inboard motor or an inboard-outboard motor, for example.

While the marine vessel preferably includes only one thruster in preferred embodiments described above, the present invention is not restricted to this. In a preferred embodiment of the present invention, the marine vessel may alternatively include a plurality of thrusters.

While the marine vessel preferably includes an engine-driven thruster in preferred embodiments described above, the present invention is not restricted to this. In a preferred embodiment of the present invention, the marine vessel may alternatively include an electrically driven or hybrid thruster.

While the storage preferably stores the table showing the relationship between the magnitude of the steering angle, the magnitude of the propulsive force, and the turning radius in preferred embodiments described above, the present invention is not restricted to this. In a preferred embodiment of the present invention, the storage may alternatively store a map showing the relationship between the magnitude of the steering angle, the magnitude of the propulsive force, and the turning radius.

While the controller preferably performs a control to determine the obstacle avoidance route based on the route function including at least the integrated value of the lateral acceleration during steering of the thruster corresponding to the predictive indicator of the magnitude of the lateral acceleration in preferred embodiments described above, the present invention is not restricted to this. In a preferred embodiment of the present invention, the controller may alternatively perform a control to determine the obstacle avoidance route based on a route function including at least the maximum value of the lateral acceleration during steering of the thruster corresponding to the predictive indicator of the magnitude of the lateral acceleration instead of the integrated value of the lateral acceleration during steering of the thruster corresponding to the predictive indicator of the magnitude of the lateral acceleration. In such a case, the maximum value of the lateral acceleration during steering of the thruster is taken into consideration as the predictive indicator, and thus maximum right-left sway that the passenger of the marine vessel receives is reduced. Consequently, discomfort due to a lateral load is reduced.

While the avoidance route is preferably determined with the destination set in preferred embodiments described above, the present invention is not restricted to this. In a preferred embodiment of the present invention, the avoidance route may alternatively be determined without setting the destination. In such a case, as an example, the route function is expressed as the following formula:

route function=(maximum value of lateral acceleration during steering of thruster)×(obstacle proximity value)×(absolute value of "current course angle−course angle at the start of control")

While the obstacle is preferably land in preferred embodiments described above, the present invention is not restricted to this. In a preferred embodiment of the present invention, the obstacle may alternatively be a predetermined structure, rock, or another marine vessel, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A navigation control system comprising:
an obstacle detector on a hull to detect a distance from the hull to an obstacle on a water surface and a position of the obstacle;
a thruster on the hull to generate a propulsive force;
a steering to steer the thruster to right and left sides of the hull; and
a controller configured or programmed to perform a control to determine an obstacle avoidance route based on a route function including at least an indicator of a lateral acceleration that acts on the hull during steering of the thruster when the obstacle is detected by the obstacle detector; wherein
the controller is configured or programmed to perform a control to:
determine the obstacle avoidance route based on the route function including an indicator of a navigation time to a set destination, in addition to the indicator of the lateral acceleration; and
automatically navigate toward the set destination along the obstacle avoidance route.

2. The navigation control system according to claim 1, wherein the controller is configured or programmed to perform a control to, using a predictive indicator of a magnitude of the lateral acceleration expected to act on the hull during the steering of the thruster as the indicator of the lateral acceleration, determine the obstacle avoidance route based on the route function including at least the predictive indicator of the magnitude of the lateral acceleration.

3. The navigation control system according to claim 2, wherein the controller is configured or programmed to perform a control to determine the obstacle avoidance route based on the route function including at least a maximum value of the lateral acceleration during the steering of the thruster corresponding to the predictive indicator of the magnitude of the lateral acceleration.

4. The navigation control system according to claim 1, wherein the controller is configured or programmed to perform a control to determine the obstacle avoidance route based on the route function including an obstacle proximity value corresponding to an indicator that increases as the distance from the hull to the obstacle decreases, in addition to the indicator of the lateral acceleration.

5. The navigation control system according to claim 1, wherein the controller is configured or programmed to start a control to determine the obstacle avoidance route based on the route function including at least the indicator of the lateral acceleration when the hull approaches the obstacle to a position at which the distance from the hull to the obstacle is a predetermined proximity distance smaller than a maximum detectable distance to the obstacle that is detectable by the obstacle detector.

6. The navigation control system according to claim 1, wherein the controller is configured or programmed to, in determining the obstacle avoidance route, cause the hull to travel straight after sequentially making a clockwise or counterclockwise turn of the hull and a counterclockwise or clockwise turn of the hull.

7. The navigation control system according to claim 1, wherein the obstacle detector includes a stereo camera or a photodetector operable to acquire the distance from the hull to the obstacle by detecting the obstacle with light.

8. The navigation control system according to claim 1, wherein the controller is configured or programmed to perform a control to determine the obstacle avoidance route so as to minimize the route function including at least the indicator of the lateral acceleration.

9. A navigation control system comprising:

an obstacle detector on a hull to detect a distance from the hull to an obstacle on a water surface and a position of the obstacle;

a thruster on the hull to generate a propulsive force;

a steering to steer the thruster to right and left sides of the hull; and a controller configured or programmed to perform a control to determine an obstacle avoidance route based on a route function including at least an indicator of a lateral acceleration that acts on the hull during steering of the thruster when the obstacle is detected by the obstacle detector; wherein the controller is configured or programmed to perform a control to:

perform a control to, using a predictive indicator of a magnitude of the lateral acceleration expected to act on the hull during the steering of the thruster as the indicator of the lateral acceleration, determine the obstacle avoidance route based on the route function including at least the predictive indicator of the magnitude of the lateral acceleration;

perform a control to determine the obstacle avoidance route based on the route function including at least an integrated value of the lateral acceleration during the steering of the thruster corresponding to the predictive indicator of the magnitude of the lateral acceleration; and automatically navigate toward a set destination along the obstacle avoidance route.

10. A navigation control system comprising:

an obstacle detector on a hull to detect a distance from the hull to an obstacle on a water surface and a position of the obstacle;

a thruster on the hull to generate a propulsive force;

a steering to steer the thruster to right and left sides of the hull; and a controller configured or programmed to perform a control to determine an obstacle avoidance route based on a route function including at least an indicator of a lateral acceleration that acts on the hull during steering of the thruster when the obstacle is detected by the obstacle detector; wherein the controller is configured or programmed to perform a control to:

perform a control to determine the obstacle avoidance route based on the route function including an obstacle proximity value corresponding to an indicator that increases as the distance from the hull to the obstacle decreases, in addition to the indicator of the lateral acceleration;

perform a control to set the obstacle proximity value to a predetermined minimum proximity value when the distance from the hull to the obstacle is equal to or greater than a predetermined separation distance, and determine the obstacle avoidance route based on the route function such that the distance from the hull to the obstacle is maintained at the predetermined separation distance or greater, and the obstacle proximity value is maintained at the predetermined minimum proximity value; and automatically navigate toward a set destination along the obstacle avoidance route.

11. A navigation control system comprising:

an obstacle detector on a hull to detect a distance from the hull to an obstacle on a water surface and a position of the obstacle;

a thruster on the hull to generate a propulsive force;

a steering to steer the thruster to right and left sides of the hull; and a controller configured or programmed to perform a control to determine an obstacle avoidance route based on a route function including at least an indicator of a lateral acceleration that acts on the hull during steering of the thruster when the obstacle is detected by the obstacle detector; and a storage to store a map or a table showing a relationship between a magnitude of a steering angle, a magnitude of the propulsive force, and a turning radius; wherein the controller is configured or programmed to perform a control to:

determine the obstacle avoidance route based on the route function including at least the indicator of the lateral acceleration and the map or the table; and automatically navigate toward a set destination along the obstacle avoidance route.

12. A marine vessel comprising:

a hull; and a navigation control system on or in the hull and including:

an obstacle detector on the hull to detect a distance from the hull to an obstacle on a water surface and a position of the obstacle;

a thruster on the hull to generate a propulsive force;

a steering to steer the thruster to right and left sides of the hull; and a controller configured or programmed to perform a control to determine an obstacle avoidance route based on a route function including at least an indicator of a lateral acceleration that acts on the hull during steering of the thruster when the obstacle is detected by the obstacle detector; wherein the controller is configured or programmed to perform a control to:

determine the obstacle avoidance route based on the route function including an indicator of a navigation time to a set destination, in addition to the indicator of the lateral acceleration; and automatically navigate toward the set destination along the obstacle avoidance route.

13. The marine vessel according to claim 12, wherein the controller is configured or programmed to perform a control to, using a predictive indicator of a magnitude of the lateral acceleration expected to act on the hull during the steering of the thruster as the indicator of the lateral acceleration, determine the obstacle avoidance route based on the route function including at least the predictive indicator of the magnitude of the lateral acceleration.

14. The marine vessel according to claim 13, wherein the controller is configured or programmed to perform a control to determine the obstacle avoidance route based on the route function including at least a maximum value of the lateral acceleration during the steering of the thruster corresponding to the predictive indicator of the magnitude of the lateral acceleration.

15. The marine vessel according to claim 12, wherein the controller is configured or programmed to perform a control to determine the obstacle avoidance route based on the route function including an obstacle proximity value corresponding to an indicator that increases as the distance from the hull to the obstacle decreases, in addition to the indicator of the lateral acceleration.

16. The marine vessel according to claim 12, wherein the controller is configured or programmed to start a control to determine the obstacle avoidance route based on the route function including at least the indicator of the lateral acceleration when the hull approaches the obstacle to a position at which the distance from the hull to the obstacle is a predetermined proximity distance smaller than a maximum detectable distance to the obstacle that is detectable by the obstacle detector.

17. A marine vessel comprising:
a hull; and
a navigation control system on or in the hull and including:
an obstacle detector on the hull to detect a distance from the hull to an obstacle on a water surface and a position of the obstacle;
a thruster on the hull to generate a propulsive force;
a steering to steer the thruster to right and left sides of the hull; and
a controller configured or programmed to perform a control to determine an obstacle avoidance route based on a route function including at least an indicator of a lateral acceleration that acts on the hull during steering of the thruster when the obstacle is detected by the obstacle detector; wherein
the controller is configured or programmed to perform a control to:
perform a control to, using a predictive indicator of a magnitude of the lateral acceleration expected to act on the hull during the steering of the thruster as the indicator of the lateral acceleration, determine the obstacle avoidance route based on the route function including at least the predictive indicator of the magnitude of the lateral acceleration;
perform a control to determine the obstacle avoidance route based on the route function including at least an integrated value of the lateral acceleration during the steering of the thruster corresponding to the predictive indicator of the magnitude of the lateral acceleration; and
automatically navigate toward a set destination along the obstacle avoidance route.

18. A marine vessel comprising:
a hull; and
a navigation control system on or in the hull and including:
an obstacle detector on the hull to detect a distance from the hull to an obstacle on a water surface and a position of the obstacle;
a thruster on the hull to generate a propulsive force;
a steering to steer the thruster to right and left sides of the hull; and
a controller configured or programmed to perform a control to determine an obstacle avoidance route based on a route function including at least an indicator of a lateral acceleration that acts on the hull during steering of the thruster when the obstacle is detected by the obstacle detector; wherein
the controller is configured or programmed to perform a control to:
perform a control to determine the obstacle avoidance route based on the route function including an obstacle proximity value corresponding to an indicator that increases as the distance from the hull to the obstacle decreases, in addition to the indicator of the lateral acceleration;
perform a control to set the obstacle proximity value to a predetermined minimum proximity value when the distance from the hull to the obstacle is equal to or greater than a predetermined separation distance, and determine the obstacle avoidance route based on the route function such that the distance from the hull to the obstacle is maintained at the predetermined separation distance or greater, and the obstacle proximity value is maintained at the predetermined minimum proximity value; and
automatically navigate toward a set destination along the obstacle avoidance route.

19. A marine vessel comprising:
a hull;
a navigation control system on or in the hull and including:
an obstacle detector on the hull to detect a distance from the hull to an obstacle on a water surface and a position of the obstacle;
a thruster on the hull to generate a propulsive force;
a steering to steer the thruster to right and left sides of the hull; and
a controller configured or programmed to perform a control to determine an obstacle avoidance route based on a route function including at least an indicator of a lateral acceleration that acts on the hull during steering of the thruster when the obstacle is detected by the obstacle detector; and
a storage to store a map or a table showing a relationship between a magnitude of a steering angle, a magnitude of the propulsive force, and a turning radius; wherein the controller is configured or programmed to perform a
   control to:
   perform a control to determine the obstacle avoidance
      route based on the route function including at least
      the indicator of the lateral acceleration and the map
      or the table; and
   automatically navigate toward a set destination along
      the obstacle avoidance route.

\* \* \* \* \*